United States Patent Office 3,159,062
Patented Dec. 1, 1964

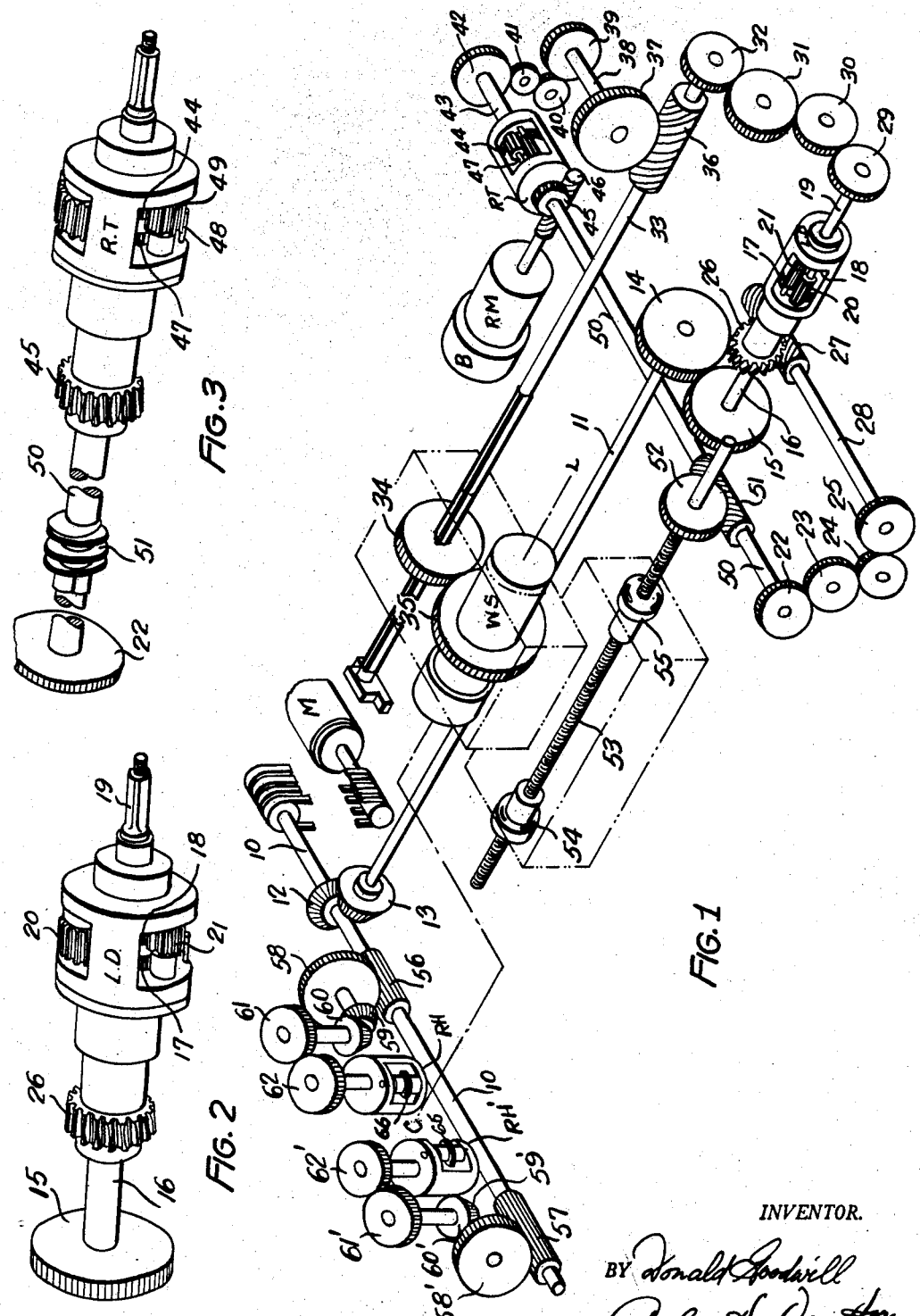

3,159,062
APPARATUS AND METHOD FOR FORMING HELICAL GEARS OR SPLINES
Donald Goodwill, Cleveland, Ohio, assignor to The Lees-Bradner Company, Cleveland, Ohio, a corporation of Ohio
Filed June 4, 1962, Ser. No. 199,927
6 Claims. (Cl. 80—16)

This invention relates to a method of and means for rolling, cutting or otherwise forming helical gears or splines, and more particularly is concerned with such method and means employing a differential gearing between the index gears and work spindle whereby a selected added or minus rotation of the work blank can be imparted and controlled to produce a desired or pre-selected lead.

An object of the invention is to eliminate the necessity of calculating differential and feed gearing and the attendant opportunity for miscalculation due to lack of skill of the calculator.

Another object of the invention is a method or process of rolling helical gears or splines whereby plus or minus rotation can be imparted to a work piece through a differential coupling between the indexing gears and the work spindle to produce a desired lead.

Another object of the invention is the provision of such means for forming helical gears or splines in a workpiece with precision and without the loss of the time ordinarily consumed in calculating and selecting gear ratios to produce a desired lead.

A further object of the invention is to eliminate the necessity of recalculation in rolling a mating gear having a different number of teeth having the same helix angle, or to increase or decrease the rate of feed.

Other objects and advantages of this invention will become more apparent as the following description of an embodiment thereof progresses, reference being made to the accompanying drawing in which like reference characters are employed to designate like parts throughout the same.

In the drawings:

FIGURE 1 is a schematic diagram of a mechanism which may be employed in carrying out my invention embodying a method and apparatus for forming gears or splines;

FIGURE 2 is a view of a lead differential gear unit forming a part of the mechanism shown in FIGURE 1; and FIGURE 3 is a view of a rapid traverse differential gear unit also included in the mechanism shown in FIGURE 1 for carrying out my improved method.

While the present invention is described and shown as applied to rolling gears and splines, it will be understood that the same is equally adapted to cutting gears and splines wherein suitable cutters may be substituted for the forming rolls illustrated in the present disclosure.

In carrying out my invention, referring first to FIGURE 1, it may be stated that while the mechanism illustrated shows that the feed movement is imparted to the work spindle, the same could be imparted to the roll heads or to both the work spindle and the roll heads in such manner that relative feed movement would be in a direction parallel with the work blank axis.

The diagrammatic view of FIGURE 1 may be more particularly described as follows:

The work spindle is indicated at WS and the roller heads at RH and RH'. The work spindle WS and the roller heads RH and RH' are all rotatably driven from the main drive shaft 10 which is driven by the motor M through a belt and pulley transmission or other suitable means at any selected or desirable selected rate.

This main drive shaft 10 drives shaft 11 by means of the gears 12 and 13 keyed or fixed to rotate with the shafts 10 and 11, respectively. On drive shaft 11 there is fixed a gear 14 which is meshed with a mating gear 15 which is fixed on the input shaft 16. A differential driving gear 17 housed within the lead differential gear housing LD drives the differential driven gear 18 disposed in axial alignment with the differential driving gear 17 and which is secured to a differential output shaft 19.

One or more pairs of relatively intermeshed differential pinions 20 and 21 each separately journaled on shafts secured within and to the casing LD transmit the drive from the gear 17 to the gear 18. Each of the pinions 20 are meshed with the gear 17 and each of the pinions 21 are intermeshed both with the pinion 20 and the gear 18.

Gears 22, 23, 24 and 25 forming the lead pick off gear train, as indicated in FIG. 1, are driven from shaft 50, and drive worm 27 and worm gear 26 which is affixed to the case or housing of the differential LD. The case LD revolves to add or subtract an increment of rotation to shaft 19. From shaft 19 through the index pick-off gears 29, 30, 31 and including selective index gear 32, this increment is transmitted together with the normal index rotation through shaft 33 and gear 34 to gear 35 fixed on the work spindle WS.

A worm 36 fixed to the shaft 33 is in mesh with a worm wheel 37 fixed to the shaft 38. Also fixed to the shaft 38 is a driving pick-off gear 39 of the feed or pick-off gear train 39, 40, 41 and 42. Output feed gear 42 is the driven gear of the feed gear train and is keyed on shaft 43. On the other end of this shaft 43 is the driving gear 44 of a rapid traverse differential mechanism RT housed within the housing shown. A worm gear 45 is fixed to the housing RT and is meshed with a worm 46 which is fixed to the shaft of the rapid traverse motor RM which is maintained non-rotatable by a brake B during the feed cycle of the mechanism.

Rotary motion is communicated from the input gear 44 to the differential driven gear 47 through differential pinions 48 and 49 which, in turn, are meshed with gears 44 and 47, respectively. Each of the differential pinions are separately journaled on shafts mounted in the differential casing RT. A preferred driving ratio between gears 44 and 47 is a 1 to 1 ratio. The driven gear 47 is secured to one end of shaft 50 while the driving pick off gear 22 of the lead gear train is fixed on the other end of the shaft 50.

A worm 51 on shaft 50 meshes with a worm wheel 52 rigidly mounted on the feed screw 53 which, when rotated, imparts longitudinal movement of the carriage in which the work spindle WS is mounted. The lead screw nuts 54 and 55 are mounted in the carriage (not shown).

The main drive shaft 10 also carries the gears 56 and 57 fixed for rotation with the shaft and which in turn are meshed with the matched gear trains 58, 59, 60, 61, 62 and 58', 59', 60', 61' and 62', respectively, forming the driving gear trains for driving the roll heads RH and RH'. Conventional sets of idle forming rolls are indicated at 65 and 66 and receive therebetween the workpiece rotatably and axially fed along the center line CL during the forming operation.

Index Gears

The index constant and consequently the number of teeth which the roll heads will roll on the peripheral surface of a blank carried by the work spindle WS is determined by the ratio of the gear sets 12–13, 14–15, 17–18, 34–35, 56–58, 57–58', 59–60, 59'–60', 61–62 and 61'–62'. For example, assuming the ratio of the matched roll head gear sets 56–58, 57–58', 59–60, 59'–60', 61–62 and 61'–62'=1:1 and that the ratio of the set 12–13=1:2 and that the ratio of the set 14–15=1:2 and that the ratio of the set 34–35=1:2.5, the combined ratio=10–1 reduction.

Thus, if the ratios for the index pick off gears 29–32 is 1 to 1 for one revolution of the work spindle WS, the roll head will rotate ten times producing ten teeth in the periphery of the work blank. The index gear formula could be expressed as $$\frac{\text{gear } 29}{\text{gear } 32} = \frac{10}{N}$$

where N equals the number of teeth desired, and the gear ratio of $$\frac{\text{gear } 29}{\text{gear } 32}$$

is the driving ratio of the index pick off gears.

*Feed Gearing*

The feed pick off gear train is indicated at 39, 40, 41 and 42 in FIGURE 1 and assuming the ratio between gears 39 to 42 to be 1 to 1 and the total ratio between gears 36–37, 44–47, and 51–52 to be 2 to 25 and that the pitch of the feed screw 53 is one-half inch, a feed of .100 would be achieved for each complete rotation of the work spindle WS.

On this basis by providing a gear at 42 having one hundred teeth, any selected feed may be obtained by installing a gear 39 having the same number of teeth as the feed required in thousandths of an inch.

The feed gear formula may be written $$\frac{\text{gear } 39}{\text{gear } 42} = 10 \times \text{feed}$$

*Lead Gearing*

The amount of work advance for each single rotation of the work spindle WS is determined by the pitch of the feed screw 53 as well as the respective ratios of the gear sets 51–52, 22–25, 26–27, the ratio between the differential gear case LD to the shaft 19, the ratio of the gear sets 29–32 and 35–34, as is the lead of the teeth or splines rolled in the blank by the rolling action of the roll heads RH and RH'.

Since the index formula referred to hereinbefore is $$\frac{\text{gear } 29}{\text{gear } 32} = \frac{10}{N}$$

the lead expressed in inches is the product of the following ratios where:

$$\frac{\text{gear } 51}{\text{gear } 52} = 2:15 \quad \frac{\text{gear } 27}{\text{gear } 26} = 1:60$$

$$\frac{LD}{19} = 2:1 \text{ and } \frac{\text{gear } 34}{\text{gear } 35} = 1:2.5$$

$$\text{Lead} = \frac{2.5}{1} \times \frac{N}{10} \times \frac{1}{2} \times \frac{60}{1} \times \frac{\text{gear } 25}{\text{gear } 22} \times \frac{2}{15} \times \frac{1}{2}$$

$$\text{Lead} = \frac{N \times \text{gear } 25}{2 \text{ gear } 22}$$

$$\frac{2 \text{ Lead}}{N} = \frac{\text{gear } 25}{\text{gear } 22}$$

∴ gear 25 : gear 22 :: 2 × Lead : N

Since the driving ratio of the lead change gears 25 and 22 is equal to twice the lead for each tooth of the gear or spline to be rolled, it is apparent that the gear ratio of the lead change gear train does not have to be calculated for gears having the same helix angle. It is only necessary to change the index driven gear 32 in the index gear train 29, 30, 31 and 32 so that the ratio of 10/N is maintained.

By way of example, and assuming the values of gear ratios are as above, a gear having 20 teeth and a 32″ lead, the index gear ratio can be expressed:

$$\frac{\text{gear } 29}{\text{gear } 32} = \frac{10}{20} \text{ or } \frac{40}{80}$$

that is, the driving gear 29 would have 40 teeth and the driven gear 32 would have 80 teeth.

In the lead gear ratio which can be expressed $$\frac{\text{gear } 25}{\text{gear } 22} = \frac{2 \text{ lead}}{N} = 2 \times \frac{32}{20} \text{ or } \frac{64}{20}$$

the driven gear 25 would have 64 teeth and the driving gear 22 would have 20 teeth.

To roll a relatively mating gear having 25 teeth and a 40″ lead, the index gear ratio can be expressed $$\frac{\text{gear } 29}{\text{gear } 32} = \frac{10}{25} \text{ or } \frac{40}{100}$$

Thus the gear 29 remains unchanged and a gear with 100 teeth is substituted for gear 32.

The lead gear ratio may be expressed $$\frac{\text{gear } 25}{\text{gear } 22} = \frac{2 \text{ lead}}{N} = 2 \times \frac{40}{25} \text{ or } \frac{80}{25} \text{ or } \frac{16}{5} \text{ or } \frac{64}{20}$$

This gear ratio $$\frac{\text{gear } 25}{\text{gear } 22} = \frac{64}{20}$$

remains unchanged.

Consequently, from these several examples, it will readily be seen that for all relatively mating helical gears the lead is in direct proportion to the respective number of teeth in the gears and the only change or substitution necessary is to select an index gear 32 having the same number of teeth as the gear that is to be rolled and, furthermore, it becomes unnecessary to change the lead gear ratio which was calculated for the original lead. The lead gear ratio remains constant for rolling all relatively mating helical gears.

From the above disclosure, and as illustrated in the drawing, it becomes clear that by virtue of a differential coupling between the index gears and the work spindle, a plus or minus rotation can be imparted to a work spindle to produce the desired lead. The invention also eliminates the necessity of recalculation in rolling a mating gear having a different number of teeth or to increase or decrease the rate of feed, the only change which it is necessary to make in rolling a mating gear being to select an index gear having the same number of teeth as the gear to be rolled.

Various changes may be made in the details of construction and arrangement of parts of the invention without departing from the spirit thereof or the scope of the appended claims.

I claim:

1. An apparatus for forming helical gears or splines in a workpiece including, a prime mover, a main drive shaft actuated by the prime mover, a shaft driven from the drive shaft, workpiece forming means driven by the main drive shaft in timed relation with said driven shaft, a lead differential, a lead differential input shaft driven from said driven shaft, a lead differential output shaft geared to and driven by said input shaft, a rotatable lead differential housing geared to said input and output shafts, an index pick-off train driven by said lead differential output shaft and including at least one selective gear component in said train, a work spindle, means driven by said index pick-off train for driving the work spindle at a rate responsive to the selected output rate of the index gear train, a rapid traverse differential, said last named differential including an input shaft, an output shaft, and a rotatable rapid traverse differential housing member geared to said input and said output shafts, a feed pick-off train driven by said work spindle driving means and having a driving connection with the said input shaft of the rapid traverse differential whereby to transmit the selected output rate of the index gear train to the rapid traverse input shaft, independent means for rotating said rotatable rapid differential housing member, a lead pick-off train interposed between and driven by the lead differential and the output shaft of the rapid differential, a lead screw for imparting longitudinal feed and rapid traverse to the work spindle in response to the driven rate of and geared to the output shaft of said rapid differential, and means driven by said lead train to transmit through said lead differential a plus or minus increment of rotation to the output shaft of said lead differential whereby to selectively increase or decrease the rate of rotation of the work spindle independently of the selected rate of both the index and feed gear trains and to thereby produce the desired helix with respect to the rate of rotation of the work spindle.

2. The apparatus as defined in claim 1 and in which the feed gear train includes at least one selective gear component for transmitting the selected output rate of the feed train through the rapid traverse differential and the output shaft thereof to the lead screw to deliver a selected feed rate to the lead screw.

3. The apparatus as defined in claim 2 and including means for selectively locking the rotatable rapid differential housing against rotation during work spindle feed but releasable to rotate said housing in rapid traverse to return the work spindle after feed has terminated.

4. An apparatus for forming helical gears or splines in a workpiece including, a prime mover, a main drive shaft, a shaft driven from the drive shaft, forming means driven by the main drive shaft in timed relation with said driven shaft, a lead differential, a lead differential input shaft driven from said driven shaft, a lead differential output shaft geared to and driven by said input shaft, a rotatable lead differential housing in geared relation to said input and output shafts, an index pick-off train driven by said lead differential output shaft and including at least one selective gear component in said train, a work spindle, a drive shaft driven by said index pick-off train for driving the work spindle at a rate responsive to the selected output rate of the index gear train, a rapid traverse differential, said last named differential including an input shaft, an output shaft, a plurality of differential pinions for transmitting the drive from the input to the output shafts, and a rotatable rapid traverse differential housing member carrying said pinions, a feed pick-off train driven by said work spindle drive shaft and having a driving connection with the said input shaft of the rapid traverse differential whereby to transmit the selected output rate of the index train to the rapid traverse input shaft, independent means for rotating said rotatable rapid differential housing member, a lead pick-off train interposed between and driven by the lead differential and the output shaft of the rapid differential, a lead screw for imparting longitudinal feed and rapid traverse to the work spindle in response to the driven rate of and geared to the output shaft of said rapid differential, and means driven by said lead train to transmit through said lead differential a plus or minus increment of rotation to the output shaft of said lead differential, said lead train driven means being operable to impart rotational movement to said lead differential housing whereby to selectively increase or decrease the rate of rotation of the work spindle independently of the selected rate of both the index and feed gear trains and to thereby produce the desired helix with respect to the rate of rotation of the work spindle.

5. An apparatus for forming helical gears or splines in a workpiece including, a prime mover, a main drive shaft actuated by the prime mover, a shaft driven from the drive shaft, forming means driven by said main drive shaft in timed relation with said driven shaft, a lead differential, a lead differential input shaft driven from said driven shaft, a lead differential output shaft geared to and driven by said input shaft, a rotatable lead differential housing geared to said input and output shafts, an index pick-off train driven by said lead differential output shaft and including at least one selective gear component in said train, a work spindle, means driven by said index pick-off train for driving the work spindle at a rate responsive to the selected output rate of the index gear train, a rapid traverse differential, said last named differential including an input shaft, an output shaft and a rotatable rapid traverse differential housing member geared to the said input and output shafts, a feed pick-off train driven by said work spindle driving means and having a driving connection with the said input shaft of the rapid traverse differential whereby to transmit the selected output rate of the index gear train to the rapid traverse input shaft, independent means for rotating said roatable rapid differential housing member, a lead pick-off train interposed between and driven by the lead differential and the output shaft of the rapid differential, a lead screw for imparting longitudinal feed and rapid traverse to the work spindle in response to the driven rate of and geared to the ouput shaft of said rapid differential, means driven by said lead train to transmit through said lead differential a plus or minus increment of rotation to the output shaft of said lead differential whereby to selectively increase or decrease the rate of rotation of the work spindle independently of the selected rate of both the index and feed gear trains and to thereby produce the desired helix with respect to the rate of rotation of the work spindle, and means for selectively locking the rotatable rapid differential housing against rotation during work spindle feed but releasable to rotate said housing in rapid traverse to return the work spindle after feed has terminated.

6. An apparatus for forming helical gears or splines in a workpiece including, a prime mover, a main drive shaft actuated by the prime mover, a shaft driven from the drive shaft, workpiece forming means driven by the main drive shaft in timed relation with said driven shaft, a lead differential, a lead differential input shaft driven from said driven shaft, a lead differential output shaft geared to and driven by said input shaft, a rotatable lead differential housing geared to said input and output shafts, an index pick-off train driven by said lead differential output shaft, a work spindle, means driven by said index pick-off train for driving the work spindle at a rate responsive to the selected output rate of the index gear train, a rapid traverse differential, said last named differential including an input shaft, an output shaft, and a rotatable rapid traverse differential housing member geared to said input and said output shafts, a feed pick-off train driven by said work spindle driving means and having a driving connection with the said input shaft of the rapid traverse differential whereby to transmit the selected output rate of the index gear train to the rapid traverse input shaft, independent means for rotating said rotatable rapid differential housing member, a lead pick-off train interposed between and driven by the lead differential and the output shaft of the rapid differential, a lead screw for imparting longitudinal feed and rapid traverse to the work spindle in response to the driven rate of and geared to the output shaft of said rapid differential, and means driven by said lead train to transmit through said lead differential a plus or minus increment of rotation to the output shaft of said lead differential whereby to selectively increase or decrease the rate of rotation of the work spindle independently of the selected rate of both the index and feed gear trains and to thereby produce the desired helix with respect to the rate of rotation of the work spindle.

References Cited in the file of this patent
UNITED STATES PATENTS

| 1,460,528 | Anderson | July 3, 1923 |
| 2,991,672 | Meyer et al. | July 11, 1961 |